United States Patent [19]

Carter

[11] 4,428,562
[45] Jan. 31, 1984

[54] STOCK GRID

[76] Inventor: Frederick J. Carter, M.S. 1436, Cumners Rd., Toowoomba, Queensland, Australia

[21] Appl. No.: 405,258

[22] Filed: Aug. 4, 1982

[30] Foreign Application Priority Data

Aug. 7, 1981 [AU] Australia .................... PF0114

[51] Int. Cl.³ ............................... A01K 3/00
[52] U.S. Cl. ........................................ 256/17
[58] Field of Search ................... 256/17, 18, 14

[56] References Cited

U.S. PATENT DOCUMENTS 2,750,157  6/1956  Van Alsburg .............. 256/17
3,301,148  1/1967  Schraudenbach ........ 256/17 X
4,163,545  8/1979  Ostermiller ................ 256/17

FOREIGN PATENT DOCUMENTS 2009822  6/1979  United Kingdom .......... 256/17

OTHER PUBLICATIONS

Pamphlet titled Humes Freeway Cattle Stops published by Humes Concrete Products.

Primary Examiner—Andrew V. Kundrat
Attorney, Agent, or Firm—McAulay, Fields, Fisher, Goldstein & Nissen

[57] ABSTRACT

A monolithic concrete stock grid including a planar base portion, a plurality of triangular cross-sectional ribs extending across the base portion and parallel to each other to define a plurality of open-ended troughs extending across the base portion and the upper portions of the ribs being so sized and spaced from one another as to allow vehicle passage but to prevent stock passage thereacross. A pair of elongated reinforcing members are disposed on either side of the grid and interconnect the upper portions of the ribs and are formed integrally therewith.

19 Claims, 5 Drawing Figures

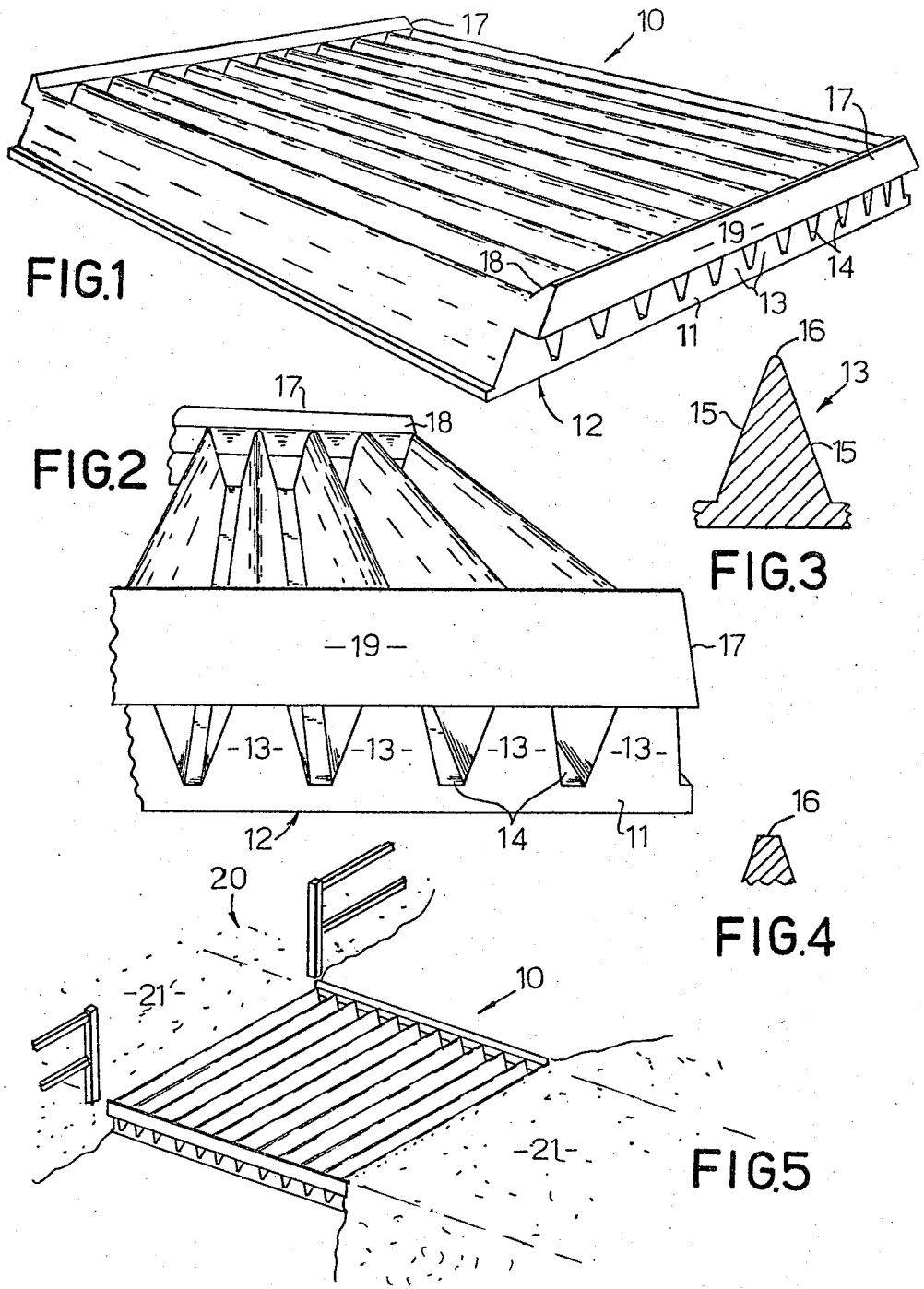

STOCK GRID

This invention relates to an improved stock grid.

Stock grids are normally used at an entrance or exit from a fenced area such as a field or paddock in substitution for a gate and are normally constructed so as to prevent stock straying out of or into the area whilst at the same time allowing vehicle access into or from the area.

There are a number of different types of stock grides which are presently available and the majority of such grids are formed of welded steel components and comprise a plurality of parallel bar members interconnected at their opposite ends by a pair of transversely extending members. Such known grids, however, have a number of disadvantages. Firstly, the above known grids are normally placed in positions so that they are supported only at their opposite ends such that in use, they are suspended above a shallow pit. In this arrangement, however, the grids tend to be damaged or broken if subject to heavy load and furthermore, the area beneath the grid tends to become waterlogged in heavy rain thus causing the grid foundations to be undermined.

A further disadvantage of the conventional stock grid is that the pit area beneath such grids often become filled with dirt and dust and it is necessary to remove the grids from their supported positions to enable more convenient cleaning of the pit to prevent damming of the water course beneath the grid. Yet a further disadvantage of metal grids is that they are relatively expensive and are subject to rust and corrosion problems.

There has been proposed a precast concrete stock grid to overcome the above disadvantages. Such a stock grid includes a solid base portion and a plurality of parallel trapezoidal cross-sectional ribs which extend across the base portion. However, this grid itself has a number of disadvantages. In particular, the base portion of the grid has to be relatively thick so that the ribs are fully supported. Accordingly, the weight of the grid is relatively high and thus installation of such a grid is difficult in many instances. Furthermore, because the ribs are only supported at their lower ends they lack lateral stability and tend to become damaged during vehicle passage thereover.

A further disadvantage of the above type of grid is that the side edges thereof are not easily discernible and consequently this may lead to vehicle accidents in certain weather conditions.

The present invention aims to overcome or alleviate at least some of the above disadvantages by providing an improved stock grid which is constructed in such a manner as to resist high weight loads as well as relatively high loads in the direction of vehicle travel. The invention also aims to provide a grid in which the opposite side edges thereof are easily discernible.

With the above and other objects in view, this invention resides broadly in a stock grid of the type including a plurality of parallel upstanding rib members, each said rib member defining with an adjacent said rib member open-ended trough means extending across said grid and wherein the upper portions of said rib members are, in use, disposed in a substantially horizontal plane and so sized and spaced from one another as to provide a support surface for vehicles but to prevent or deter stock passage thereacross and wherein the improvement comprises elongated reinforcing means extending transversely of said rib member and disposed at least on one side of said grid and interconnecting said rib members at or adjacent the upper portions thereof.

In order that the invention may be more readily understood and put into practical effect, reference will now be made to the accompanying drawings which illustrate a preferred embodiment of the invention and wherein:

FIG. 1 is a perspective view of a stock grid according to the present invention;

FIG. 2 is a further perspective view from the side illustrating one end of the stock grid shown in FIG. 1;

FIG. 3 is a cross-sectional view of a typical rib used in the grid illustrated in FIG. 1;

FIG. 4 is a cross-sectional view of an upper portion of an alternative rib configuration; and FIG. 5 is a perspective view illustrating the grid in an installed attitude.

Referring to the drawings there is illustrated a preferred form of stock grid 10 according to the present invention. The stock grid 10 is preferably a one-piece or monolithic structure formed of steel reinforced concrete and includes a base portion 11 which has a substantially planar under surface 12 to support the grid in use and a plurality of ribs 13 which extend upwardly from the base portion 11.

As shown, the ribs 13 extend substantially parallel across the grid and define with an adjacent rib respective open-ended troughs 14 also extending across the grid 10. Each rib 13 in this embodiment is of substantially triangular cross-sectional form as shown in FIG. 3 and includes downwardly inclined and diverging side walls 15. Preferably also, the upper portions of the ribs 13 are slightly rounded as at 16. In use, the upper portions of the ribs 16 are disposed in a substantially horizontal plane to define a planar support surface. Furthermore, the upper portions of the ribs 16 are spaced apart transversely a sufficient distance as to prevent animals walking across whilst providing a support surface for vehicles or the like to be driven across the grid. The upper rounded portions 16 of the ribs 13 do not fully support the feet of stock and if say cattle attempt to walk across the grid their hooves being unsupported by the upper portions 16 of the ribs 13 tend to slip down the inclined side walls 15 of the ribs into the troughs 14. Animals are thus discouraged or prevented from walking thereacross. In an alternative construction, the upper portions 16 of the ribs 13 may be flattened as shown in FIG. 4, and sized so as not to fully support animal hooves.

The grid 10 also includes in this embodiment a pair of elongated side members 17 which are arranged at either side of the grid 10 and extend transversely of the ribs 13 as shown. The side members 17 are arranged outwardly beyond the ends of the ribs 13 and are formed integrally therewith so as to interconnect the ribs adjacent their upper portions 16 and to provide strengthening for the ribs 13 in the direction of travel of vehicles. Furthermore, the side members 17 preferably project upwardly beyond the upper portions 16 of the ribs to define guide means which indicate the respective opposite sides of the grid 10. It will also be noted that the side members 17 are so arranged as to leave the outer ends of the troughs 14 relatively open. This will ensure that rainwater, for example, will be unimpeded from outward flow from the grid. The side members 17 may be in any form desired but preferably, as in this embodiment, the inner surface 18 of the side members 17 is inclined upwardly and outwardly while the outer surface 19 thereof is substantially vertical. The inclined surface 18 will then tend to guide vehicle wheels back onto the ribs 13 if they are deflected therefrom for any reason. Preferably reinforcing rods extend longitudinally within the elongated side members 17.

To install the grid in position as shown in FIG. 5, the desired location of the grid, for example adjacent a gate opening 20 into a fenced area, is flattened so that the planar under surface 12 of the base portion 11 may be seated thereupon. The road surface 21 on either side of the grid may then be built up in the manner illustrated at either end of the grid so that it merges with the upper portion 16 of the end ribs 13 and so that there is a smooth transition between the road surface and the upper surface of the grid. Alternatively, the placement area of the grid may be first excavated to provide a level and flat surface and a layer of bedding sand is provided on the excavated surface and compacted so that the grid may be placed thereupon and fully supported.

The grid 10 illustrated may be used in tandem or side-by-side attitude with a further grid so as to provide a wider grid area. In such an arrangement it is possible to eliminate one of the side members 17 on each grid so that a composite grid having a wide planar support surface is provided whilst the opposite edges thereof are defined by the remaining side members 17.

In a further arrangement it is preferred that the opposite end ribs 13 of the grid 10 are of a thickened or wider triangular configuration so as to absorb initial impact shocks from a vehicle wheel or the like as the wheels pass onto the grid from the road. In yet a further arrangement the grid may be made so that the ribs are of right angled triangular cross-sectional form having one upstanding side wall and an inclined side wall.

In a typical grid construction which has been found particularly suitable the upper portions of the rib members 13 are spaced apart a distance of two hundred centimeters (approximately eight inches) and the rib members are approximately two hundred centimeters high. Of course, any number of rib members may be used in the grid.

Whilst the above has been given by way of illustrative example of the invention, all such modifications and variations as would be apparent to persons skilled in the art are deemed to fall within the broad scope and ambit of the invention as defined in the appended claims.

I claim:

1. A monolithic stock grid including a substantially planar base portion and a plurality of parallel rib members upstanding therefrom, each said rib member defining with an adjacent said rib member open-ended trough means extending across said base portion and wherein said base portion is adapted to be supported in use in a substantially horizontal attitude such that the upper portions of said rib members are disposed in a substantially horizontal plane, the number of said rib members being such, and said rib members being so sized and spaced from one another as to provide a support area for vehicles but to prevent or deter stock passage thereacross and wherein there is provided elongated reinforcing means extending transversely of said rib members and disposed at least at one side of said grid, said reinforcing means being formed integrally with said rib members and interconnecting said rib members at least at or adjacent the upper portions thereof.

2. A stock grid according to claim 1, wherein said elongated reinforcing means extends upwardly beyond the upper portions of said rib means to define guide means at the side of said grid.

3. A stock grid according to claim 2, wherein the inner side surface of said elongated reinforcing means is inclined outwardly and upwardly from said upper portions of said rib members.

4. A stock grid according to claim 1 wherein said rib members are of substantially triangular cross sectional form.

5. A stock grid according to claim 2, wherein said elongated reinforcing means are disposed beyond the corresponding ends of said rib members at one side of said grid.

6. A stock grid according to claim 5, wherein the inner side surface of said elongated reinforcing means is inclined outwardly and upwardly from said upper portions of said rib members.

7. A stock grid according to claim 6 wherein said rib members are of substantially triangular cross sectional form.

8. A stock grid according to claim 4, wherein the upper portions of said rib members are rounded.

9. A stock grid according to claim 4, wherein the upper portions of said rib members are substantially flat.

10. A stock grid according to claim 4 formed of reinforced concrete.

11. A monolithic stock grid adapted to be laid on a planar surface and preventing moisture penetration through the planar surface to the underlying sub soil, including
a substantially planar base portion and a plurality of parallel rib members upstanding therefrom;
each said rib member defining with an adjacent said rib member open-ended trough means extending across said base portion to permit unimpeded outward flow from the grid, said base portion being adapted to be supported in use in a substantially horizontal attitude such that the upper portions of said rib members are disposed in a substantially horizontal plane;
the number of said rib members being such, and said rib members being so sized and spaced apart from one another as to provide a support area forming a planar surface for vehicles but to prevent or deter stock passage there-across; and
elongated reinforcing means extending transversely of said rib members and being disposed at least at one side of said grid, said reinforcing means being formed integrally with said rib members and interconnecting said rib members at least at or adjacent the upper portions thereof.

12. A stock grid according to claim 11, wherein said elongated reinforcing means extends upwardly beyond the upper portions of said rib members to define guide means at the side of said grid.

13. A stock grid according to claim 12, wherein said elongated reinforcing means are disposed beyond the corresponding ends of said rib members at one side of said grid.

14. A stock grid according to claim 11, wherein the inner side surface of said elongated reinforcing means is inclined outwardly and upwardly from said upper portions of said rib members.

15. A stock grid according to claim 11 wherein said rib members are of substantially triangular cross sectional form.

16. A stock grid according to claim 15, wherein the upper portions of said rib members are rounded.

17. A stock grid according to claim 15, wherein the upper portions of said rib members are substantially flat.

18. A stock grid according to claim 11 formed of reinforced concrete.

19. A stock grid according to claim 15, wherein said elongated reinforcing means extends upwardly beyond the upper portions of said rib members to define guide means at the side of said grid.

* * * * *